US005797064A

United States Patent [19]
Raj et al.

[11] Patent Number: 5,797,064
[45] Date of Patent: Aug. 18, 1998

[54] PSEUDO PHOTO INDUCED DISCHARGED CURVE GENERATOR FOR XEROGRAPHIC SETUP

[75] Inventors: Guru B. Raj, Fairport; Roger W. Budnik, Rochester; James M. Pacer, Webster, all of N.Y.

[73] Assignee: Xerox Corporation, Stamford, Conn.

[21] Appl. No.: 835,580

[22] Filed: Apr. 9, 1997

[51] Int. Cl.[6] .................................................. G03G 15/00
[52] U.S. Cl. ........................... 399/46; 399/49; 399/51; 399/53
[58] Field of Search ............................. 399/49, 51, 53, 399/56, 72, 46

[56] References Cited

U.S. PATENT DOCUMENTS

| | | |
|---|---|---|
| 4,348,099 | 9/1982 | Fantozzi .................................. 399/48 |
| 4,553,033 | 11/1985 | Hubble, III et al. .................... 250/353 |
| 4,647,184 | 3/1987 | Russell et al. ......................... 399/49 X |
| 5,383,005 | 1/1995 | Thompson et al. ...................... 399/50 |
| 5,416,564 | 5/1995 | Thompson et al. ...................... 399/27 |
| 5,436,705 | 7/1995 | Raj ............................................ 399/30 |

Primary Examiner—William J. Royer
Attorney, Agent, or Firm—Ronald F. Chapuran

[57] ABSTRACT

A method of regulating photo induced discharge of an imaging surface without the use of an ESV sensor by providing and developing iterative, incremental exposure patches on the imaging surface. The developed incremental exposure patches are then sensed and the image projecting system is adjusted in order to provide consistent exposure and development levels.

17 Claims, 4 Drawing Sheets

5,797,064

1

PSEUDO PHOTO INDUCED DISCHARGED CURVE GENERATOR FOR XEROGRAPHIC SETUP

BACKGROUND OF THE INVENTION

The invention relates to xerographic process control, and more particularly, to a pseudo photo induced discharge curve generator for a xerographic setup.

Typically, an electrophotographic process is controlled by adjusting development field, cleaning field, exposure intensity, and toner concentration. An electrostatic voltmeter is used to measure the electrostatic fields. The electrostatic fields are adjusted successively to establish a desired operating range. Voluminous data is collected and analyzed to generate lookup tables in order to bring the density of an image, the developed mass per unit area within prescribed limits.

A common technique for monitoring developed mass per unit area is to artificially create a "test patch" of a predetermined desired density. The actual density of the printing material (toner or ink) in the test patch can then be optically measured to determine the effectiveness of the printing process in placing this printing material on the print sheet.

The optical device for determining the density of toner on the test patch, which is often referred to as a "densitometer", is disposed along the path of the photoreceptor, directly downstream of the development of the development unit. There is typically a routine within the operating system of the printer to periodically create test patches of a desired density at predetermined locations on the photoreceptor by deliberately causing the exposure system thereof to charge or discharge as necessary the surface at the location to a predetermined extent.

The test patch is then moved past the developer unit and the toner particles within the developer unit are caused to adhere to the test patch electrostatically. The denser the toner on the test patch, the darker the test patch will appear in optical testing. The developed test patch is moved past a densitometer disposed along the path of the photoreceptor, and the light absorption of the test patch is tested; the more light that is absorbed by the test patch, the denser the toner on the test patch.

In the prior art U.S. Pat. No. 4,348,099 discloses a control system for use in an electrophotographic printing machine. A charge control loop, an illumination control loop, a bias control loop, and a toner dispensing loop are provided. Test patches, an infrared densitometer, and an electrometer are used to measure charge level, exposure intensity, toner concentration, and developer bias.

U.S. Pat. No. 4,553,033 discloses an infrared densitometer for measuring the density of toner particles on a photoconductive surface. A tonal test patch is projected by a test patch generator onto the photoconductive surface. The patch is then developed with toner particles. Infrared light is emitted from the densitometer and reflected back from the test patch. Control circuitry, associated with the densitometer, generates electrical signals proportional to the developer toner mass of the test patch.

U.S. Pat. No. 5,416,564 and U.S. Pat. No. 5,383,005 disclose a current sensing device that generates electrical signals proportional to the current flow between the photoconductive surface and a development station as toner is applied to the photoconductive surface at pre-determined regions or patches. A charging device is controlled in response to the generated signals.

2

A difficulty with prior art systems is that multiple sensors, particularly the use of an ESV sensor is expensive.

It would be desirable, therefore, to be able to eliminate the need for multiple sensors and to be able to measure and control toner development using a simple toner area coverage sensor.

It is an object of the present invention therefore to provide a new an improved technique for process control, without the use of an ESV sensor. It is another object of the present invention to be able to provide a photo induced discharge curve using a (TAC) Total Area Coverage sensor. Other advantages of the present invention will become apparent as the following description proceeds, and the features characterizing the invention will be pointed out with particularity in the claims annexed to and forming a part of this specification.

SUMMARY OF THE INVENTION

The present invention is concerned with a method of regulating photo induced discharge of an imaging surface without the use of an ESV sensor by providing and developing iterative, incremental exposure patches on the imaging member. The developed incremental exposure patches are then sensed by a tack sensor and the image projecting system is adjusted in order to provide consistent exposure and development levels.

For a better understanding of the present invention, reference may be had to the accompanying drawings wherein the same reference numerals have been applied to like parts.

DETAILED DESCRIPTION OF THE DRAWINGS

DETAILED DESCRIPTION OF THE PREFERRED EMBODIMENT

While the present invention will hereinafter be described in connection with a preferred embodiment thereof, it will be understood that it is not intended to limit the invention to that embodiment. On the contrary, it is intended to cover all alternatives, modifications and equivalents that may be included within the spirit and scope of the invention as defined by the appended claims.

Figure 1:
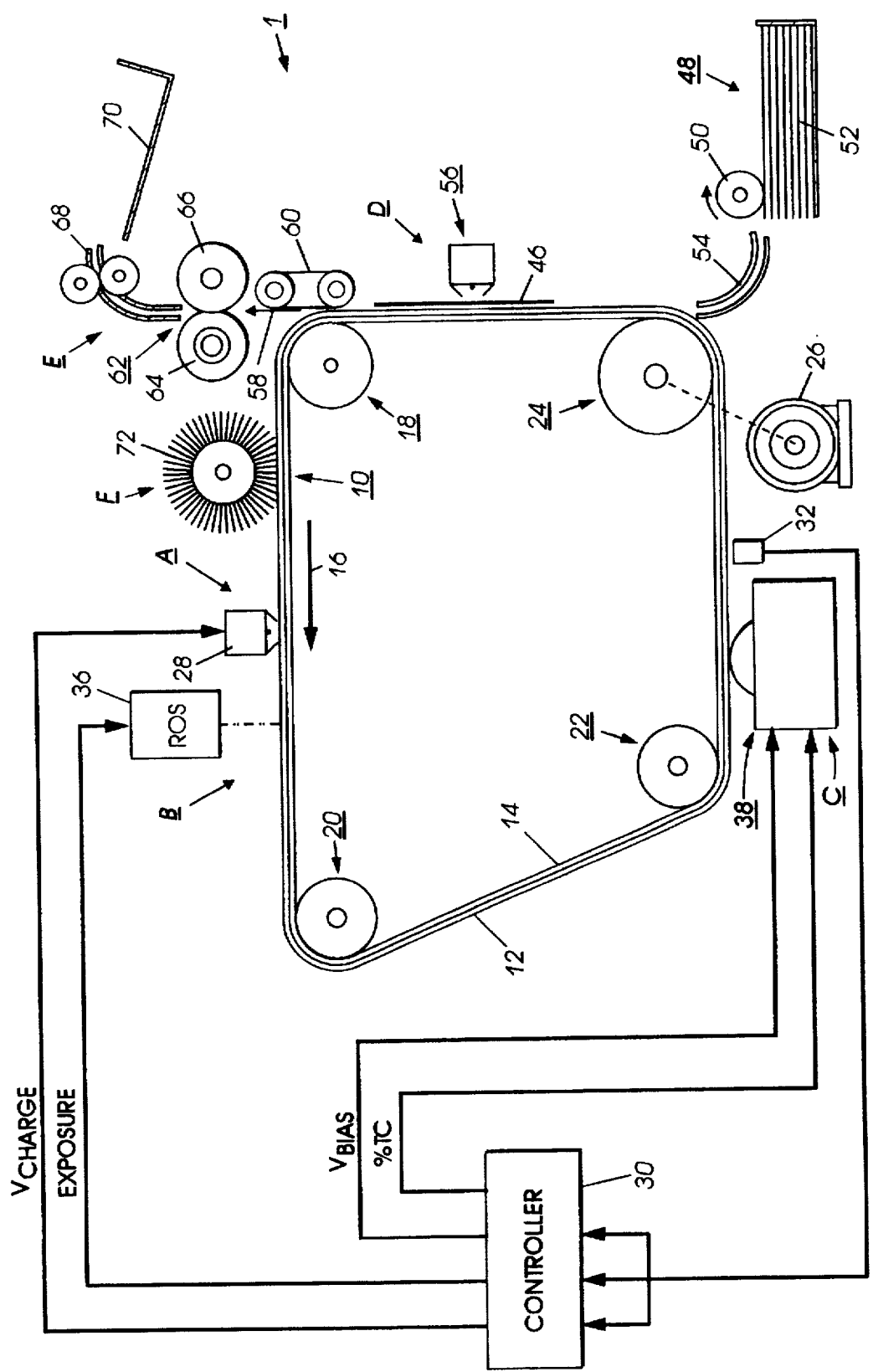
FIG. 1 is an elevational view illustrating a typical electronic imaging system using a photo induced discharge curve (PIDC) control in accordance with the present invention.

Turning to FIG. 1, the electrophotographic printing machine 1 employs a belt 10 having a photoconductive surface 12 deposited on a conductive substrate 14. By way of example, photoconductive surface 12 may be made from a selenium alloy with conductive substrate 14 being made from an aluminum alloy which is electrically grounded. Other suitable photoconductive surfaces and conductive substrates may also be employed. Belt 10 moves in the direction of arrow 16 to advance successive portions of photoconductive surface 12 through the various processing stations disposed about the path of movement thereof. As shown, belt 10 is entrained about rollers 18, 20, 22, 24. Roller 24 is coupled to motor 26 which drives roller 24 so as to advance belt 10 in the direction of arrow 16. Rollers 18, 20, and 22 are idler rollers which rotate freely as belt 10 moves in the direction of arrow 16.

Initially, a portion of belt 10 passes through charging station A. At charging station A, a corona generating device, indicated generally by the reference numeral 28 charges a portion of photoconductive surface 12 of belt 10 to a relatively high, substantially uniform potential.

Next, the charged portion of photoconductive surface 12 is advanced through exposure station B. At exposure station B, a Raster Input Scanner (RIS) and a Raster Output Scanner (ROS) are used to expose the charged portions of photoconductive surface 12 to record an electrostatic latent image thereon. The RIS (not shown), contains document illumination lamps, optics, a mechanical scanning mechanism and photosensing elements such as charged couple device (CCD) arrays. The RIS captures the entire image from the original document and coverts it to a series of raster scan lines. The raster scan lines are transmitted from the RIS to a ROS 36. ROS 36 illuminates the charged portion of photoconductive surface 12 with a series of horizontal lines with each line having a specific number of pixels per inch. These lines illuminate the charged portion of the photoconductive surface 12 to selectively discharge the charge thereon. An exemplary ROS 36 has lasers with rotating polygon mirror blocks, solid state modulator bars and mirrors.

Still another type of exposure system would merely utilize a ROS 36 with the ROS 36 being controlled by the output from an electronic subsystem (ESS) which prepares and manages the image data flow between a computer and the ROS 36. The ESS (not shown) is the control electronics for the ROS 36 and may be a self-contained, dedicated minicomputer. Thereafter, belt 10 advances the electrostatic latent image recorded on photoconductive surface 12 to development station C.

One skilled in the art will appreciate that a light lens system may be used instead of the RIS/ROS system heretofore described. An original document may be positioned face down upon a transparent platen. Lamps would flash light rays onto the original document. The light rays reflected from original document are transmitted through a lens forming a light image thereof. The lens focuses the light image onto the charged portion of the photoconductive surface to selectively dissipate the charge thereon. This records an electrostatic latent image on the photoconductive surface which corresponds to the informational areas contained within the original document disposed upon the transparent platen.

At development station C, magnetic brush developer system, rnP indicated generally by the reference numeral 38, transports developer material comprising carrier granules having toner particles adhering It triboelectrically thereto into contact with the electrostatic latent image recorded on photoconductive surface 12. Toner particles are attracted from the carrier granules to the latent image forming a powder image on photoconductive surface 12 of belt 10.

After development, belt 10 advances the toner powder image to transfer station D. At transfer station D, a sheet of support material 46 is moved into contact with the toner powder image. Support material 46 is advanced to transfer station D by a sheet feeding apparatus, indicated generally by the reference numeral 48. Preferably, sheet feeding apparatus 48 includes a feed roll 50 contacting the uppermost sheet of a stack of sheets 52. Feed roll 50 rotates to advance the uppermost sheet from stack 52 into sheet chute 54. Chute 54 directs the advancing sheet of support material 46 into a contact with photoconductive surface 12 of belt 10 in a timed sequence so that the toner powder image developed thereon contacts the advancing sheet of support material at transfer station D.

Transfer station D includes a corona generating device 56 which sprays ions onto the backside of sheet 46. This attracts the toner powder image from photoconductive surface 12 to sheet 46. After transfer, the sheet continues to move in the direction of arrow 58 onto a conveyor 60 which moves the sheet to fusing station E.

Fusing station E includes a fuser assembly, indicated generally by the reference numeral 62, which permanently affixes the powder image to sheet 46. Preferably, fuser assembly 62 includes a heated fuser roller 64 driven by a motor and a backup roller 66. Sheet 46 passes between fuser roller 64 and backup roller 66 with the toner powder image contacting fuser roller 64. In this manner, the toner powder image is permanently affixed to sheet 46. After fusing, chute 68 guides the advancing sheet to catch tray 70 for subsequent removal from the printing machine by the operator.

Invariably, after the sheet of support material is separated from photoconductive surface 12 of belt 10, some residual particles remain adhering thereto. These residual particles are removed from photoconductive surface 12 at cleaning station F. Cleaning station F includes a preclean corona generating device (not shown) and a rotatably mounted preclean brush 72 in contact with photoconductive surface 12. The preclean corona generator neutralizes the charge attracting the particles to the photoconductive surface. These particles are cleaned from the photoconductive surface by the rotation of brush 72 in contact therewith. One skilled in the art will appreciate that other cleaning means may be used such as a blade cleaner. Subsequent to cleaning, a discharge lamp (not shown) floods photoconductive surface 12 with light to dissipate any residual charge remaining thereon prior to the charging thereof for the next successive imaging cycle.

In order to maintain image quality and compensate for copy to copy density variations there is provided controller 30 that controls the tonal reproduction curve. Controller 30 adjusts compensation filters in real time to control parameter variations. Controller 30 divides the adaptive control into two tasks, parameter identification and control modification. The estimated results are used to modify the compensation parameters.

In FIG. 1, state variables such as charge voltage ($V_{CHARGE}$), developer bias voltage ($V_{BIAS}$), exposure intensity (EXPOSURE), and toner concentration (% TC) are used as actuators to control tonal reproduction. Changes in output generated by the controller 30 are measured by a toner area coverage (TAC) sensor 32. TAC sensor 32, which is located after development station C, measures the developed toner mass for difference area coverage patches recorded on the photoconductive surface 12.

The manner of operation of the TAC sensor 32, shown in FIG. 1, is described in U.S. Pat. No. 4,553,003 to Hubble et al. which is hereby incorporated in its entirety into the instant disclosure. TAC sensor 32, is an infrared reflectance type densitometer that measures the density of toner particles developed on the photoconductive surface 12.

Figure 2:
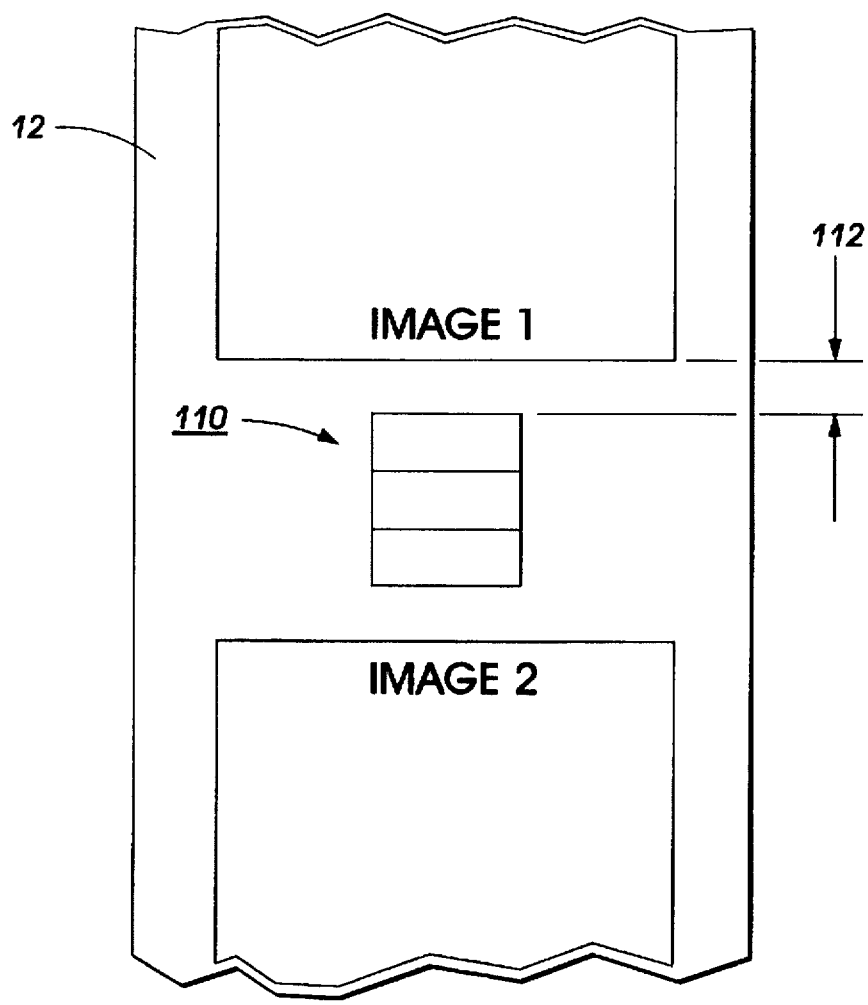
FIG. 2 illustrates a target area interposed between adjacent images on a photoconductive member.

Referring to FIG. 2, a composite toner test patch 110 is imaged in the interdocument area of photoconductive surface 12. The photoconductive surface 12, is illustrated as containing two documents images: image 1 and image 2. The test patch 110 is shown in the interdocument space between image 1 and image 2 and in that portion of the photoconductive surface 12 sensed by the TAC sensor 32 to provide the necessary signals for control. The composite patch 110 measures 15 millimeters, in the process direction, and 45 millimeters, in the cross process direction. Before the TAC sensor 32 can provide a meaningful response to the relative reflectance of the patch, the TAC sensor 32 must be calibrated by measuring the light reflected from a bare or clean area portion 112 of photoconductive surface 12. For calibration purposes, current to the light emitting diode (LED) internal to the TAC sensor 32 is increased until the voltage generated by the TAC sensor 32 in response to light reflected from the bare or clean areas 112 is between 3 and 5 volts.

In general, the present invention reduces cost. Process control was designed without an Electrostatic voltmeter (ESV). Typical xerographic setups use an ESV to compensate for variance in exposure source and/or photoreceptor discharge speed to enable consistent inputs to a development subsystem. PIDC setup is needed to operate a system around the optimum contrast potentials, which will provide better copy quality. This operating point will produce optimal density by avoiding overexposing, or under exposing with the laser. In this invention, Pseudo Photo Induced Discharged Curve(PIDC) generation enable xerographic setup procedure.

The setup procedure (without ESV) determines the knee of the PIDC whenever a photoreceptor or ROS is changed. Initially a xerographic exerciser is run to make sure that the system is not in a dysfunctional state. At the same time ROS is stepped up with an increment of 10 bits or 1 erg/cm$^2$ steps and 87.5% patch is developed and read by Toner Area Coverage sensor (TAC). Under nominal operating conditions these developed patches saturate slightly beyond the knee of the PIDC. The difference in these readings are tabulated and filtered and compared with a threshold for minimum and maximum operating charge voltage levels.

Pseudo PICD generation is as follows:

Set change to minimum charge level and all other actuators to nominal operating points. Then tabulate exposure level and corresponding TAC reads for patches. Repeat the above process after setting the charge level to maximum charging level and tabulate patch reads. A high frequency digital filtering scheme is employed to filter high frequency noisy readings. The differences between successive TAC readings as determined to calculate slopes for each case. These slopes are compared with stored thresholds which are application specific.

The knee of the PIDC is identified when the slope is below a threshold value for three successive incremental reads. A linear interpolation between minimum charge and maximum charge is used to provide needed exposure the expose to knee of the PIDC.

This process identifies the knee for minimum and maximum operating charge levels. A linear interpolation is used to identify the knee of the PIDC for any other charge level. The knee of the PIDC for nominal operating voltage is set and this correlation between charge and exposure is used for all other operating conditions as determined by the tonal reproduction curve (TRC) controller in setup as well as closed loop operation.

A xerographic setup procedure is used to setup the xerographic system at nominal set-points whenever there is a change in developer housing, toner, dispenser, xerographic CRU (consists of photoreceptor, charge, erase, cleaning, transfer subsystems), ROS changes.

Figure 3:
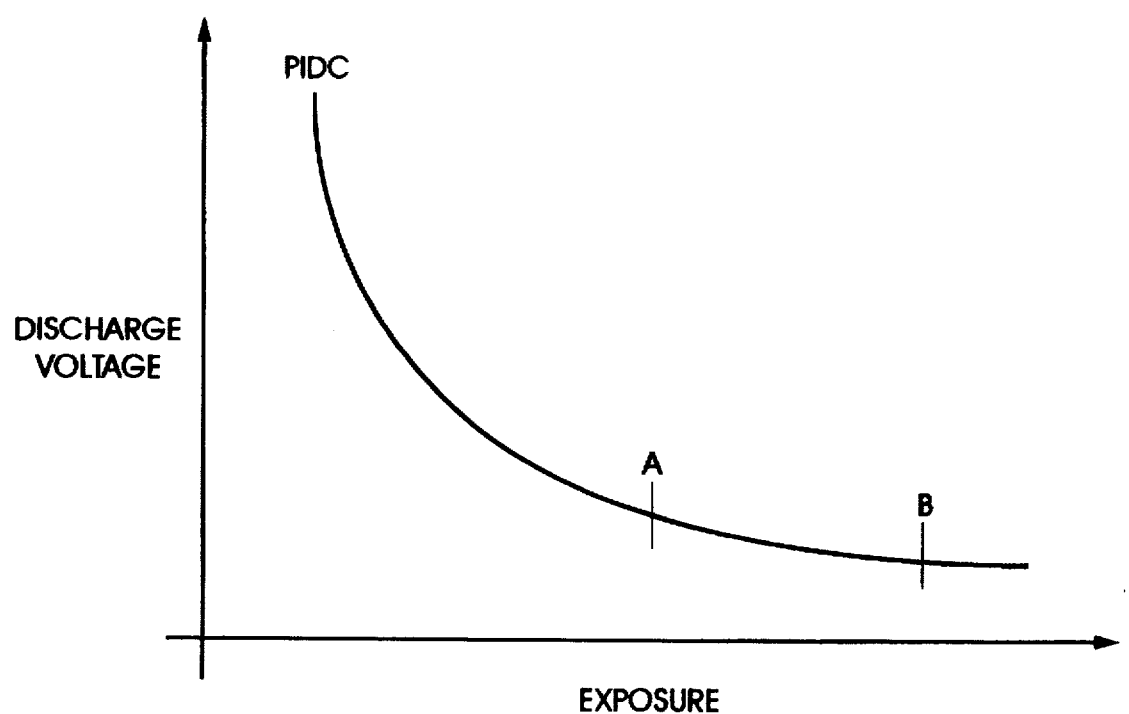
FIG. 3 illustrates a typical photo induced discharge curve.

With reference to FIG. 3, there is disclosed a typical photo induced discharged curve, in particular, showing photoreceptor discharged voltage along the y axis in relation to exposure intensity along the x axis. Points A and B on the PIDC illustrate a preferred position of operation, in particular in a more linear slope of the PIDC. In accordance with the present invention, using a total area coverage (TAC) sensor, incremental exposure steps and readings of densities of developed patches are provided to maintain the discharged voltage exposure intensity relationship within the desired target points.

Figure 4:
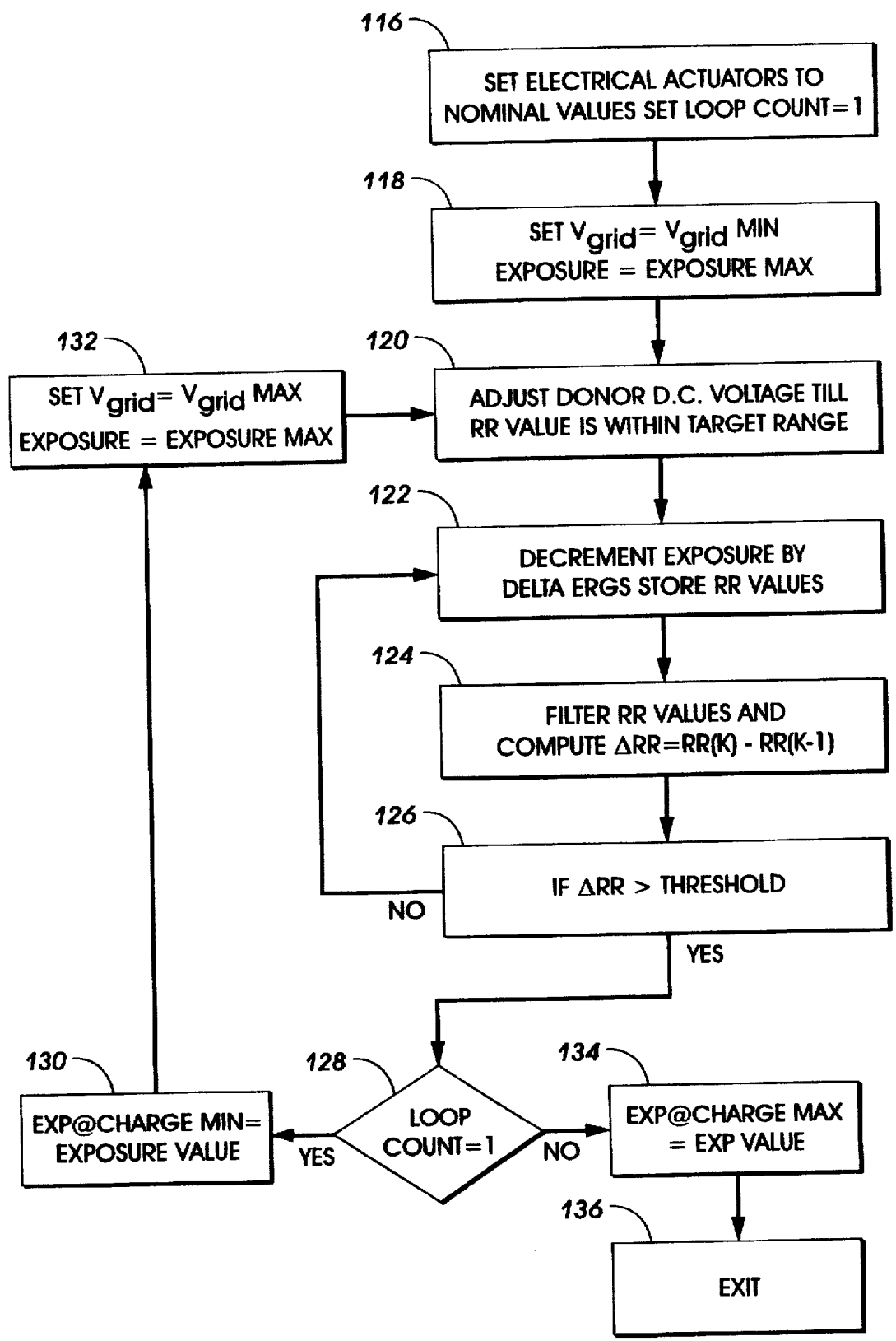
FIG. 4 is a low chart illustrating photo induced discharge control in accordance with the present invention.

In operation as illustrated in FIG. 4, various electrical actuators are set to nominal values and the set loop count set to one as shown in block 116. Set loop count equals one is a low voltage setting and set loop count equal two is a high voltage setting. As shown in block 118, the voltage on the developer grid is set to a minimum voltage and the exposure of the exposure device is set to a maximum. In block 120, the donor roll DC voltage is adjusted until the ETAC sensor reflective reflectance value is within a target.

In block 122 the exposure intensity is decremented by delta ergs or levels of intensity and the corresponding reflective reflectance values stored in the control. At block 124 the reflective reflectance values are filtered and the delta or change of reflective reflectance for each increment of exposure provided. At block 126 there is a decision whether or not the change in the reflective reflectance is greater than a threshold. If not, the control loops back to decrement another exposure level at block 122. If the change of reflective reflectance is greater than the threshold, a determination is made as to the loop count as illustrated at block 128. If the loop count is equal to one or the low voltage level, then the exposure charge minimum is equal to the exposure value shown at block 130 and at block 132, the grid voltage is set to a grid max, the exposure set to an exposure max, and the loop count set equal to two or the high voltage level. The process is then repeated as shown at block 120. The donor roll DC voltage is adjusted until the reflective reflectance values are within a target range. If at block 128 the loop count is not equal to one, but is at a count of two, then as shown at block 134 the exposure charged maximum is equal to the exposure value and the procedure is concluded as shown at block 136.

While there has been illustrated and described what is at present considered to be a preferred embodiment of the present invention, it will be appreciated that numerous changes and modifications are likely to occur to those skilled in the art, and it is intended to cover in the appended claims all those changes and modifications which fall within the true spirit and scope of the present invention.

We claim:

1. In a printing machine having a moving imaging surface, a sensor a projecting system for modulating a beam and exposing an image onto the imaging surface, a developer for application of toner to the image projected onto the imaging surface for transfer of the image to a medium, a method of generating a pseudo photo induced discharge curve within the machine for development control comprising the steps of;

setting a minimum photo induced discharge level and set machine to nominal operating points, tabulating a set of exposure levels and corresponding sensor readings for minimum level, setting a maximum photo induced discharge level and set machine to nominal operating points, tabulating a set of exposure levels and corresponding sensor readings for maximum level, calculating differences between successive sensor readings to determine curve slopes, comparing slopes with stored thresholds to determine correct operating range for minimum and maximum charge levels, and interpolating between the minimum and maximum charge levels to set optimum correlation between exposure and all charge levels.

2. The method of claim 1 wherein the sensor is a toner area coverage (TAC) sensor.

3. The method of claim 1 including the step of providing high frequency digital filtering of the sensor readings.

4. The method of claim 1 wherein the step of comparing slopes with stored thresholds to determine correct operating range for minimum and maximum charge levels includes the step of identifying that the slope is below a threshold value for three successive reads.

5. The method of claim 1 including the step of responding to the optimum correlation between exposure and all charge levels for operating conditions determined by a tone reproduction curve controller.

6. The method of claim 1 including the step of generating a pseudo photo induced discharge curve within the machine for development control at selected machine events.

7. The method of claim 6 wherein selected machine events include changes in developer housing, toner dispenser, and raster output scanner.

8. In a printing machine having a moving imaging surface, a projecting system for modulating a beam and exposing an image onto the imaging surface, a developer for application of toner to the image projected onto the imaging surface for transfer of the image to a medium, a method of regulating photo induced discharge of the imaging surface comprising the steps machine of;

providing iterative, incremental exposure patches on the imaging surface, developing the iterative incremental exposure patches on the imaging surface, sensing the developed exposure patches, and adjusting the exposure of the projecting system in order to provide consistent exposure and development levels.

9. The method of claim 8 wherein the step of adjusting the exposure of the projecting system in order to provide consistent exposure and development levels includes the step of tabulating a set of exposure levels and corresponding sensor readings for a minimum exposure level.

10. The method of claim 9 wherein the step of adjusting the exposure of the projecting system in order to provide consistent exposure and development levels includes the step of tabulating a set of exposure levels and corresponding sensor readings for a maximum exposure level.

11. The method of claim 10 including the step of calculating differences between successive sensor readings to determine curve slopes.

12. The method of claim 11 including the step of comparing slopes with stored thresholds to determine correct operating range for minimum and maximum charge levels.

13. The method of claim 12 including the step of interpolating between the minimum and maximum charge levels to set optimum correlation between intermediate exposure and charge levels.

14. The method of claim 13 wherein sensing is provided by a toner area coverage (TAC) sensor.

15. The method of claim 10 wherein the step of sensing the developed exposure patches includes the step of providing high frequency digital filtering of the sensor readings.

16. The method of claim 12 wherein the step of comparing slopes with stored thresholds to determine correct operating range for minimum and maximum charge levels includes the step of identifying that the slope is below a threshold value for successive reads.

17. In a printing machine having a moving imaging surface, a projecting system for modulating a beam and exposing an image onto the imaging surface, a developer for application of toner to the image projected onto the imaging surface for transfer of the image to a medium, a method of generating a pseudo photo induced discharge curve within the machine for development control comprising the steps of;

setting a minimum photo induced discharge level and set machine to nominal operating points, tabulating a set of exposure levels and corresponding sensor reads for minimum level, setting a maximum photo induced discharge level and set machine to nominal operating points, tabulating a set of exposure levels and corresponding sensor reads for maximum level, calculating differences between successive sensor reads to determine curve slopes, comparing slopes with stored thresholds to determine correct operating range for minimum and maximum charge levels, and interpolating between the minimum and maximum charge levels to set optimum correlation between exposure and all charge levels.

* * * * *